US009880043B2

(12) United States Patent
Ochiai et al.

(10) Patent No.: US 9,880,043 B2
(45) Date of Patent: Jan. 30, 2018

(54) LIQUID LEVEL DETECTION DEVICE AND REFRIGERATION CYCLE

(71) Applicant: Mitsubishi Electric Corporation, Tokyo (JP)

(72) Inventors: Yasutaka Ochiai, Tokyo (JP); Makoto Saito, Tokyo (JP); Fumitake Unezaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 282 days.

(21) Appl. No.: 14/432,559

(22) PCT Filed: May 21, 2013

(86) PCT No.: PCT/JP2013/064000
§ 371 (c)(1),
(2) Date: Mar. 31, 2015

(87) PCT Pub. No.: WO2014/054312
PCT Pub. Date: Apr. 10, 2014

(65) Prior Publication Data
US 2015/0292932 A1 Oct. 15, 2015

(30) Foreign Application Priority Data
Oct. 5, 2012 (WO) .................. PCT/JP2012/076013

(51) Int. Cl.
*G01F 23/24* (2006.01)
*G01F 23/22* (2006.01)

(52) U.S. Cl.
CPC ............ *G01F 23/246* (2013.01); *G01F 23/22* (2013.01)

(58) Field of Classification Search
CPC .............................. G01F 23/246; G01F 23/22
See application file for complete search history.

(56) References Cited

U.S. PATENT DOCUMENTS 4,307,606 A * 12/1981 Johnson .................. G01F 23/22
374/189
4,449,404 A * 5/1984 Bohme .................. G01F 23/246
73/295

(Continued)

FOREIGN PATENT DOCUMENTS

JP 5-273028 A 10/1993
JP 11-253915 A 9/1999

(Continued)

OTHER PUBLICATIONS

Office Action dated Jan. 5, 2016 issued in corresponding JP patent application No. 2014-539625 (and English translation).

(Continued)

*Primary Examiner* — Emmanuel Duke
(74) *Attorney, Agent, or Firm* — Posz Law Group, PLC

(57) ABSTRACT

A liquid level detection device at least includes a heating member that heats a container, a temperature measurement element disposed on a side of the heating member opposite to the container, a thermal conductor disposed between the heating member and the container, an elastic body that presses the heating member with a certain amount of force, a terminals for supplying power to the heating member, a fixture that covers the heating member, the temperature measurement element, the thermal conductor, the elastic body and the terminals and mount those on the container, wherein the heating member does not come into contact with the terminals when at least one of the thermal conductor and the fixture is inappropriately mounted on a container.

18 Claims, 12 Drawing Sheets

(56) References Cited

U.S. PATENT DOCUMENTS

| | | | | |
|---|---|---|---|---|
| 5,097,248 A * | 3/1992 | Kumada | ............... | G01F 23/241 |
| | | | | 338/151 |
| 5,174,153 A * | 12/1992 | Nakano | .................. | G01F 23/22 |
| | | | | 340/622 |
| 2003/0035462 A1* | 2/2003 | Savoie | ................. | G01F 23/246 |
| | | | | 374/141 |
| 2006/0005570 A1* | 1/2006 | Yamada | ................. | F25B 43/02 |
| | | | | 62/470 |

FOREIGN PATENT DOCUMENTS

| | | | |
|---|---|---|---|
| JP | 2002-214020 A | | 7/2002 |
| JP | 2002214020 A | * | 7/2002 |
| JP | 2006-83739 A | | 3/2006 |
| JP | 2008-39726 A | | 2/2008 |
| JP | 4378668 B2 | | 10/2009 |
| JP | 2011-89717 A | | 5/2011 |

OTHER PUBLICATIONS

International Search Report of the International Searching Authority dated Aug. 13, 2013 for the corresponding international application No. PCT/JP2013/064000 (and English translation).
Chinese Office Action dated Feb. 27, 2017 in the corresponding CN application No. 201380051950.0 (English translation attached).
Wu Wencai, "Automobile Detection and Diagnosis", Beijing University of Posts and Telecommunications Press, Mar. 31, 2007, pp. 171-173. (English translation attached).
Office Action dated Jul. 24, 2017 issued in corresponding CN application No. 201380051950.0 (and English translation).

* cited by examiner

F I G. 7
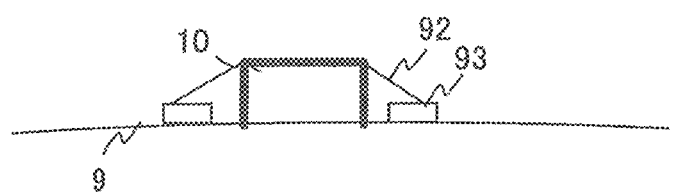
F I G. 8
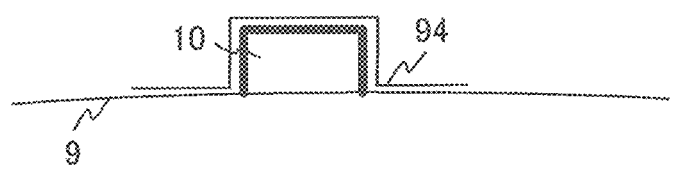
F I G. 9
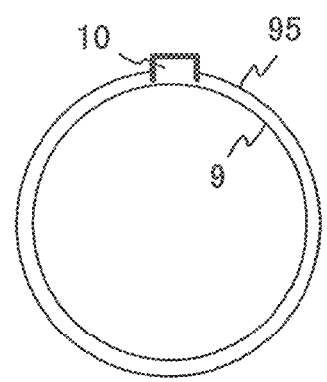

F I G. 1 8
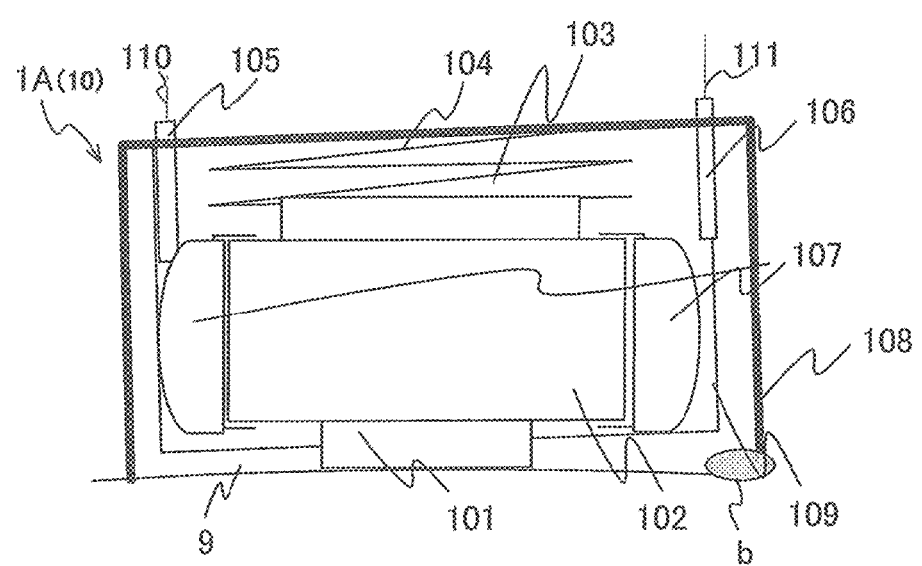

LIQUID LEVEL DETECTION DEVICE AND REFRIGERATION CYCLE

CROSS REFERENCE TO RELATED APPLICATION

This application is a U.S. national stage application of International Application No. PCT/JP2013/064000 filed on May 21, 2013 and is based on International Application No. PCT/2012/076013 filed on Oct. 5, 2012, the disclosures of which are incorporated by reference.

TECHNICAL FIELD

The present invention relates to a liquid level detection device that determines a liquid level position in a container, and a refrigeration cycle apparatus which includes the container measured by the liquid level detection device.

BACKGROUND ART

Conventionally, there is a liquid level detection device which has a sensor adhered on the outer surface of a container that contains liquid so that the liquid level position in the container can be detected (for example, see Patent Literature 1).

The liquid level detection device described in Patent Literature 1 includes a sensor body in a strip shape which is formed of a stack of a temperature measurement layer for measuring the temperature on the surface of the container and a heating layer for heating the container. When in use, the sensor body is adhered on the outer surface of the container with the longitudinal direction being oriented in the up and down direction of the container and the temperature measurement layer being located on the container side. The heat of the heating layer reaches the surface of the container via the temperature measurement layer, and due to this heat and the difference in heat transfer coefficient of the gas/liquid in the container, difference in temperature is generated between a portion of the temperature measurement layer which corresponds to the liquid in the container and a portion which corresponds to the gas in the container. Accordingly, the liquid level position is detected by using this difference in temperature in Patent Literature 1.

Further, as an installation method to the container, there is a magnet attraction device that allows an attraction surface of the liquid level detection sensor which uses ultrasonic wave to be brought into close contact with the container (for example, see Patent Literature 2).

CITATION LIST

Patent Literature

Patent Literature 1: Japanese Unexamined Patent Application Publication No. 2008-39726 (e.g., pages 6 and 7, FIGS. 1 to 5)
Patent Literature 2: Japanese Patent No. 4378668 (e.g., Embodiments 1 and 2)

SUMMARY OF INVENTION

Technical Problem

The liquid level detection device described in Patent Literature 1 uses the sensor body in a strip shape which is adhered on the surface of the container with the longitudinal direction being oriented in the up and down direction. In such a liquid level detection device, the sensor body needs to be mounted on the surface of the container so as to extend across both the gas section and the liquid section. As a result, for example in the case of a large container, the expected range of the height position of the liquid section is large, and accordingly, the sensor body also needs to be long. Such a configuration is not versatile. Therefore, a liquid level detection device having high versatility can be achieved regardless of size of container by providing a plurality of sensors in the up and down direction on the surface of the container so that liquid level detection are performed based on the temperature measurements of the sensor.

However, even if a plurality of sensors (sensors which include the temperature measurement layer and the heating layer) are used, there is a problem as described below.

That is, since the heat from the heating layer is transmitted to the surface of the container via the temperature measurement layer, variation in measurements of the temperature measurement layer may be larger than difference in temperature in the gas section/liquid section, which leads to failure of liquid level detection. This variation is due to ununiformity of heat resistance between the container and the heating layer. There are four reasons for this as described below.

The first reason is that the degree of close contact between the container and the heating layer varies depending on the sensors, and when the sensor is not closely in contact with the container, an air layer having low heat transmission is present between the container and the sensor.

The second reason is that a temperature measurement layer is present between the container and the heater.

The third reason is that adhesion force between each of the heaters and the container are not the same.

The fourth reason is that there is an effect of external disturbance such as outside air and rain.

As described above, even if a plurality of sensors described in Patent Literature 1 (sensors which include the temperature measurement layer and the heating layer) are used, liquid level detection may not be accurately performed due to variation in measurements of the temperature measurement layer in the sensors.

In the magnet attraction device described in Patent Literature 2, the attraction surface of the liquid level detection sensor which uses ultrasonic wave is brought into close contact with the container. This magnet attraction device of Patent Literature 2 seemingly can reduce variation in the liquid level detection sensors when the magnet attraction device is used in the liquid level detection sensor described in Patent Literature 1. In this case, however, there are problems as described below.

The first problem is, when the liquid level detection sensor is not appropriately mounted (for example, a foreign matter is present between the sensor section and the container or between the fixture and the container, or the surface of the container has irregularities), the amount of heat released from the heating layer to the container decreases and the heating layer is abnormally heated. Although this may not lead to an unsafe state, gas-liquid determination may be incorrect since abnormal measurements are indicated.

The second problem is that there is variation in heat release surface from the sensor heating layer to the container. When the heating layer is non-deforming type, the heating layer can not be in close contact with the container and makes point contact with the container, and accordingly, variation in heat release increases. Even if a deforming type thermal conductor is interposed between the container and the heating layer when they are brought into contact, the thermal conductor may be deformed and extend beyond the heating layer, thereby failing to achieve uniform heat release surface from the heating layer to the container and causing variation in heat release surface.

The third problem is that the method of Patent Literature 2 can not be applied when the sensor heating layer is deformed.

The present invention has been made in view of the above problems, and the objective of the invention is to provide a liquid level detection device and a refrigeration cycle apparatus that can perform gas-liquid determination while reducing variation in measurements of a plurality of temperature measurement layers during detection of liquid level in the container by using a heating member that heats the container and a plurality of temperature measurement layers.

Solution to Problem

According to the present invention, a liquid level detection device that heats a plurality of positions of a container which is a liquid level measurement object and measures the temperatures, and detects a liquid level in the container based on the measured temperatures, the liquid level detection device includes a heating member disposed on a surface of the container and heats the container, a temperature measurement element, an elastic body for pushing the heating member toward the container, and a mounting tool for mounting the heating member, the temperature measurement element and the elastic body on the container, wherein the container is heated by the heating member depending on a state of the mounting tool being mounted relative to the container.

According to the present invention, a refrigeration cycle apparatus includes a refrigerant circuit formed of a compressor, a condenser, an expansion valve and an evaporator which are connected by a pipe, wherein a container whose liquid level is detected by the above liquid level detection device is disposed between the evaporator and the compressor so as to be connected to the evaporator and the compressor.

Advantageous Effects of Invention

According to the present invention, the liquid level detection device can perform gas-liquid determination while reducing variation in measurements of a plurality of temperature measurement layers since the container is heated depending on a state of the mounting tool being mounted relative to the container.

Further, according to the present invention, the refrigeration cycle apparatus can be inexpensive, reduce variation in measurements, achieve easy installation of sensors and detect excess refrigerant in the refrigerant circuit since the refrigeration cycle apparatus is provided with the container whose liquid level is detected by the above liquid level detection device.

BRIEF DESCRIPTION OF DRAWINGS

FIG. 7 is a view which shows one example of installation method of the liquid level detection device according to Embodiment 1 of the invention.

FIG. 8 is a view which shows one example of installation method of the liquid level detection device according to Embodiment 1 of the invention.

FIG. 9 is a view which shows one example of installation method of the liquid level detection device according to Embodiment 1 of the invention.

FIG. 18 is a schematic view which shows that a foreign matter is present between a fixture and a container of the liquid level detection device according to Embodiment 1 of the present invention.

DESCRIPTION OF EMBODIMENTS

Figure 1:
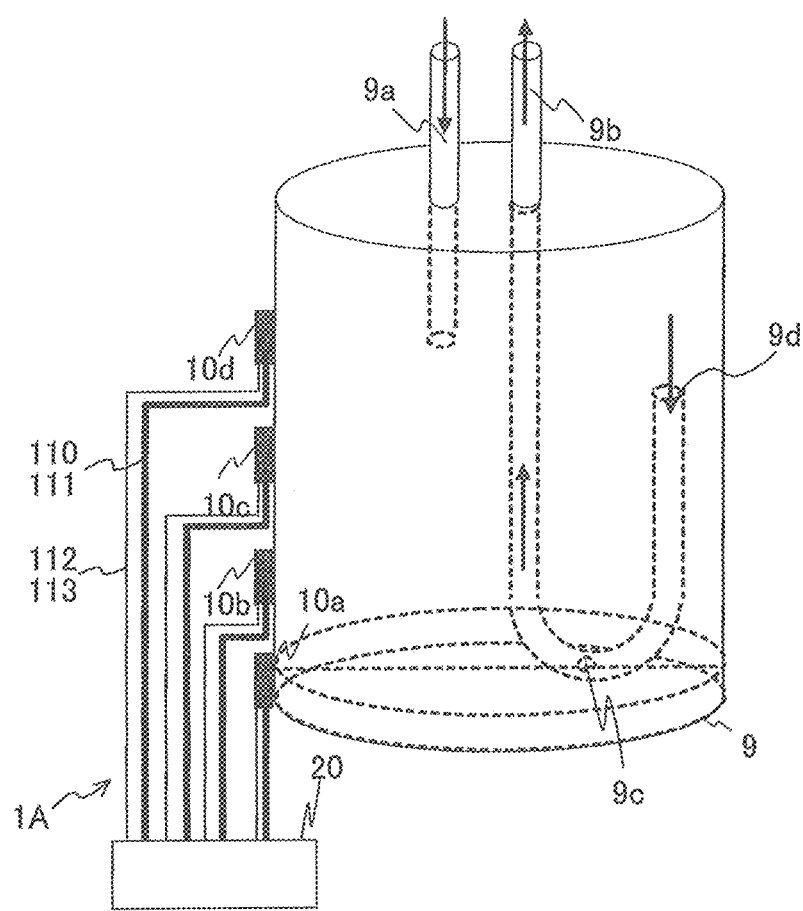
FIG. 1 is a schematic view which shows a state in which a liquid level detection device according to Embodiment 1 of the invention is installed in a container which is a component of a refrigeration cycle apparatus.

With reference to the drawings, the configuration, liquid level detection principle, gas-liquid determination method and installation method of a liquid level detection device according to Embodiments of the invention will be described. In the following Embodiments, an example of liquid level detection device as a component of a refrigeration cycle apparatus which is disposed on a low pressure side and has a container that stores refrigerant as a measurement object. The size relationship of components may not be to scale in the drawings including FIG. 1. The same reference numbers denote the same or corresponding elements in the drawings including FIG. 1, which applies to throughout the description herein. Further, the forms of components described herein are for illustration purposes only and the invention is not limited thereto.

Embodiment 1

Figure 2:
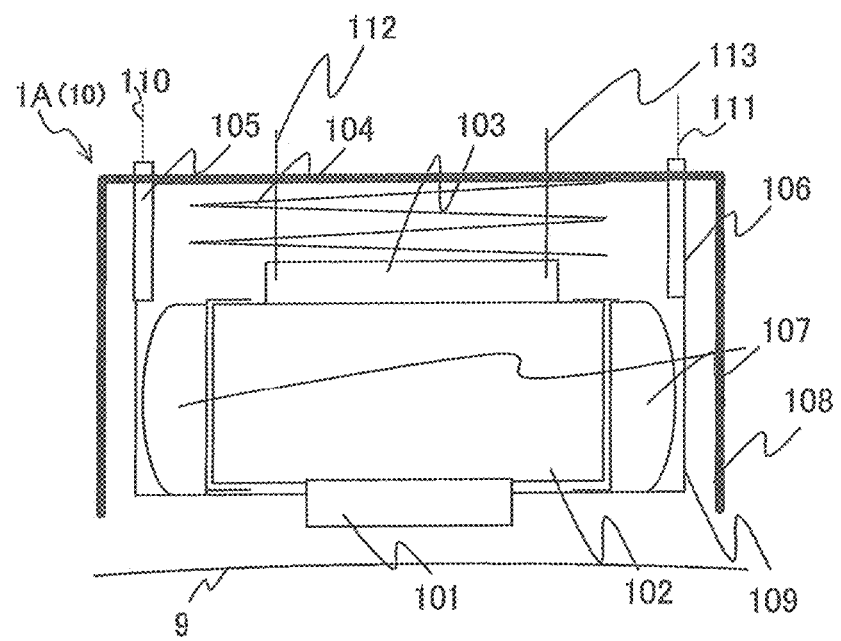
FIG. 2 is a schematic view which shows a schematic configuration of the liquid level detection device according to Embodiment 1 of the invention.
Figure 3:
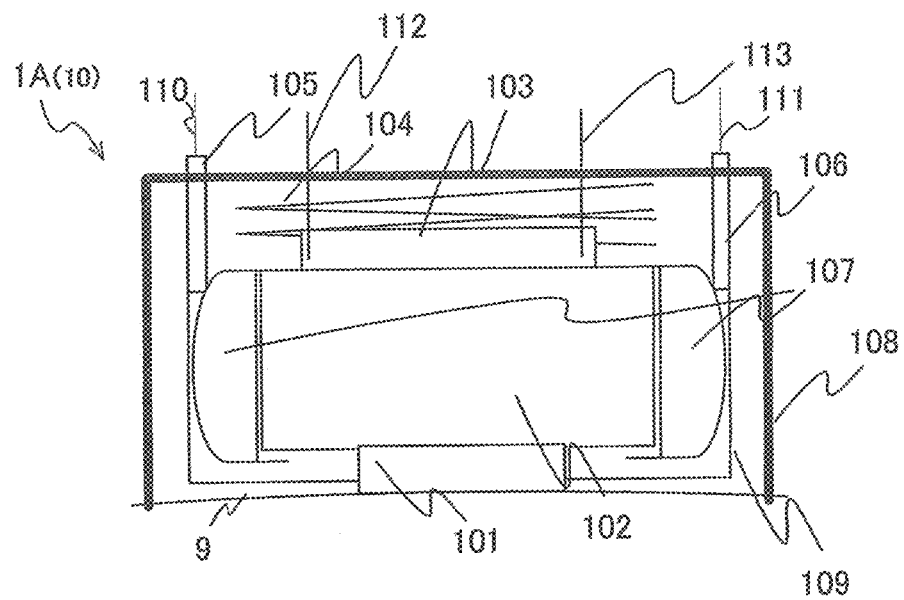
FIG. 3 is a schematic view which shows a schematic configuration of the liquid level detection device according to Embodiment 1 of the invention.

FIG. 1 is a schematic view which shows a state in which a liquid level detection device 1A according to Embodiment 1 of the invention is installed in a container 9 which is a component of a refrigeration cycle apparatus. FIGS. 2 and 3 are schematic views which show a schematic configuration of the liquid level detection device 1A. The liquid level detection device 1A will be described with reference to FIGS. 1 to 3. The arrow in FIG. 1 indicates a flow direction of refrigerant. FIG. 2 shows a schematic configuration of the liquid level detection device 1A before it is installed in the container 9, and FIG. 3 shows a schematic configuration of the liquid level detection device 1A after it is installed in the container 9.

<Container as a Measurement Object>

First, with reference to FIG. 1, the container 9 which is provided as a liquid level measurement object will be described. As described above, the container 9 as a liquid level measurement object is one of the components of the refrigeration cycle apparatus. The refrigeration cycle apparatus at least includes, in addition to the container 9, a compressor, a condenser (radiator), a throttling device (expansion valve) and an evaporator (which is described in Embodiment 4), which provides a refrigerant circuit through which refrigerant circulates. The container 9 is disposed on a low pressure side of the refrigeration cycle apparatus (a portion from the throttling device via the evaporator to the compressor). The container 9 is provided for two purposes.

The first of the purposes of providing the container 9 is storing lubricant oil for lubricating the compressor. A specific amount of lubricant oil stored in the container 9 disposed upstream of the compressor should be returned to the compressor since the compressor is disposed downstream of the container 9 and lubricant oil is necessary for operation of the compressor.

The second of the purposes of providing the container 9 is storing excess liquid refrigerant of the refrigeration cycle apparatus. In the refrigeration cycle apparatus, the amount of refrigerant which is necessary for the refrigeration cycle apparatus varies depending on the operation state and control state, and the refrigeration cycle apparatus is usually filled with maximum required amount of refrigerant. Accordingly, as the necessary amount of refrigerant decreases due to the operation state and control state, part of liquid refrigerant becomes excessive. This excess refrigerant is called excess liquid refrigerant, and the container 9 is provided for storing the excess liquid refrigerant.

The container 9 is made of iron for pressure resistance, the wall thickness is, for example, 3 to 4 mm, and the liquid level inside the container 9 cannot be seen from the outside.

In general, the container 9 includes a main body of a cylindrical shape. That is, the outer surface of the container 9 is a cylindrical surface.

As shown in FIG. 1, the container 9 includes two pipes, which are an inlet pipe 9a and an outlet pipe 9b. The inlet pipe 9a and the outlet pipe 9b are disposed in the upper part of the container 9 so as to extend between the inside and outside of the container 9 in the up and down direction. The inlet pipe 9a is provided for allowing refrigerant to flow into the container 9. The outlet pipe 9b is provided for allowing refrigerant to flow out of the container 9.

The outlet pipe 9b is generally formed in a substantially J-shape in front view with an oil return hole 9c being formed at the bottom of J-shape, and an upper end of the outlet pipe 9b extends from the upper part of the container 9 to be connected to the compressor. Further, the end of the outlet pipe 9b which is located in the container 9 is a suction port 9d which suctions refrigerant in the container 9. This configuration is provided since a specific amount of lubricant oil needs to be returned to the compressor. The oil return hole 9c formed at the bottom of the outlet pipe 9b causes the pressure in the outlet pipe 9b to be decreased due to the suction flow rate of gas refrigerant which is suctioned from the suction port 9d, thereby allowing the oil to be suctioned from the oil return hole 9c and returned to the compressor.

The oil return hole 9c is formed not at the bottom of the container 9, but above the bottom of the container 9. Accordingly, oil or liquid refrigerant dissolved in oil is regularly stored in the container 9 up to the height of the oil return hole 9c, and the liquid is not emptied from the container 9.

<Configuration of Liquid Level Detection Device 1A>

Next, a configuration of the liquid level detection device 1A will be described with reference to FIGS. 1 to 3.

The liquid level detection device 1A includes a plurality of sensors 10a to 10d (hereinafter, also collectively referred to as sensor 10, if they do not need to be individually identified) which are mounted on the surface of the container 9 and a control measurement device 20 that controls the sensor 10 and measures the sensor signal from the sensor 10.

The sensors 10a to 10d each have a similar configuration, and include a thermal conductor 101, a heating member 102, a temperature measurement element 103, an elastic body 104, a terminal 105, a terminal 106, a guide 107, and a fixture 108. Further, the sensors 10a to 10d are connected to the control measurement device 20 via a feeder line 110 and a feeder line 111, and a signal line 112 and a signal line 113. As shown in FIG. 1, the sensors 10a to 10c are disposed at different height positions on the outer surface of the container 9.

The thermal conductor 101 serves as a thermal conductor layer. The heating member 102 is provided for heating the container 9. The temperature measurement element 103 serves as a temperature measurement layer. The elastic body 104 is provided for pressing the heating member 102 toward the container 9 with a certain amount of force. The terminal 105 and the terminal 106 is used for supplying power to the heating member 102. The guide 107 is provided for moving the heating member 102 in a direction vertical to the container 9. The fixture 108 covers those (the thermal conductor 101, the heating member 102, the temperature measurement element 103, the elastic body 104, the terminal 105, the terminal 106, and the guide 107) and fixes them together to the container 9. A parts holding section 109 is provided for holding at least one of the thermal conductor 101, the heating member 102, the temperature measurement element 103, and the guide 107.

(Thermal Conductor 101)

The thermal conductor 101 is formed of a sheet having a constant thermal conductivity and thickness across the entire sheet and, for example, made of polymer having high thermal conductivity such as silicon or a metal such as iron, copper and aluminum. The purpose of providing the thermal conductor 101 is for obtaining uniform thermal resistance between the heating members 102 of a plurality of sensors 10 which constitute the liquid level detection device 1A and the container 9. When the sensor 10 is in close contact with the container 9, the thermal conductor 101 may be deformed and extend beyond the heating member, and consequently, uniform heat transfer areas may not be obtained. Therefore, the thermal conductor 101 may have an outer shape smaller than that of the heating member 102 (a resistor (self-heating thermistor 120 (see FIG. 22) in Embodiment 2, 3) so that uniform heat transfer areas can be obtained even if the thermal conductor 101 is deformed. With this configuration, variation of heat transfer areas of a plurality of sensors can be reduced to achieve uniform heat transfer areas.

(Heating Member 102)

The heating member 102 is configured to generate heat when the terminal 105, the terminal 106 come into contact therewith. In order to avoid variation in the sensor measurements of the sensors 10, the heating member 102 of the respective sensors 10 have the same resistance value and heat generation amount. Further, the heating member 102 is, for example, formed as a rectangular resistor which is difficult to be processed. Since the container 9 has a curved outer surface, a small sized resistor is desirable for facilitating close contact. Further, the heating member 102 itself may be a resistor, or may be formed as a resistor protected by ceramics or the like.

(Temperature Measurement Element 103)

The temperature measurement element 103 uses a thermoelectric conversion element such as thermoelectric couple or a temperature measuring resistor such as thermistor, and is connected to the control measurement device 20 via the signal line 112, signal line 113. The temperature measurement element 103 is desirably small in size and has a small heat capacity in order to reduce variation.

(Elastic Body 104)

The elastic body 104 is made of a spring, leaf spring, rubber or the like which is elastically deformed by a certain amount of force. In the case where the sensor 10 is not fixed to the container 9 as shown in FIG. 2, the elastic body 104 is configured to press the thermal conductor 101, the heating member 102, the temperature measurement element 103 or the like to the lower end of the parts holding section 109. Accordingly, the elastic body 104 can press each of the elements with a force larger than a certain amount to prevent each of the elements from being displaced. In so doing, since the heating member 102 or the guide 107 is held by the parts holding section 109, the thickness of the thermal conductor 101 extends from the parts holding section 109. Further, the terminal 105 and the terminal 106 are electrically short-circuited with the heating member 102.

In the case where the fixture 108 is in close contact with the container 9 and the sensor 10 is fixed to the container 9 by a certain amount of force as shown in FIG. 3, a repulsive force from the container 9 is applied so that the thickness of the thermal conductor 101 extending from the fixture 108 is retracted. As a result, the heating member 102, the temperature measurement element 103 are held suspended above the parts holding section 109. This repulsive force becomes constant when a force is applied to bring the fixture 108 in close contact with the container 9. Even if an excessive force is applied to the sensor 10, the repulsive force of the container 9 which presses back the fixture 108 increases, and accordingly, the force pressing the sensor 10 and the repulsive force are offset by the amount which corresponds to the excessive force.

As described above, when the sensor 10 is mounted by a force that brings the fixture 108 in close contact with the container 9, the heating member 102 can be in close contact with the container 9 via the thermal conductor 101 in a plurality of sensors 10, thereby preventing variation in measurements. Since the terminal 105, terminal 106 and the heating member 102 are electrically conducted via the guide 107, the temperature of the heating member 102 increases.

(Terminal 105, Terminal 106, Guide 107)

The terminal 105, the terminal 106 and the guide 107 are made of an electric conductor such as a metal. Since the heating member 102 is difficult to be processed, the inside of the fixture 108 is moved in the vertical direction toward the container 9 by using the guide 107.

The terminal 105, the terminal 106 come into contact with the guide 107 when the sensor 10 is appropriately mounted on the container 9, while the terminal 105, the terminal 106 do not come into contact with the guide 107 when the sensor 10 is inappropriately mounted on the container 9. Accordingly, the heating member 102 is energized when the sensor 10 is appropriately mounted, while the heating member 102 is not energized when the sensor 10 is inappropriately mounted. The description "inappropriately mounted" means that the sensor 10 is not in a predetermined state in which it performs its functions.

(Fixture 108)

The fixture 108 is a component necessary for obtaining uniform adhesion forces between the heating member 102 and the container 9. The heating member 102 has a U-shape in a horizontal cross sectional view (one of four sides of a rectangular shape is open in a horizontal cross sectional view) and two end points of the open side are in close contact with the container 9 so that the heating member 102 can be in close contact with the curvature of the outer surface of the container 9 via the thermal conductor 101. With this configuration, the distance by which the thermal conductor 101 is pressed in a plurality of sensors 10 can be uniform, and the repulsive force of the elastic bodies 104 can be uniform. As a result, uniform adhesion force between the heating member 102 and the container 9 can be obtained via the thermal conductor 101, thereby preventing variation in measurements.

Although FIG. 2 shows that the fixture 108 covers the thermal conductor 101, the heating member 102, the temperature measurement element 103, the elastic body 104, the terminal 105, the terminal 106 and the guide 107 and fixes them together to the container 9, they may not be fixed to the container 9. That is, the thermal conductor 101, the heating member 102, the temperature measurement element 103, the elastic body 104, the terminal 105, the terminal 106 and the guide 107 may be fixed to the container 9 via the fixture 108. In this sense, the fixture 108 corresponds to a "mounting tool" of the present invention.

The fixture 108 may not necessarily be configured to fix all the thermal conductor 101, the heating member 102, the temperature measurement element 103, the elastic body 104, the terminal 105, the terminal 106 and the guide 107 to the container 9, and may be configured to fix at least the heating member 102, the temperature measurement element 103 and the elastic body 104 to the container 9. This also applies to Embodiments 2, 3. When the heating member 102 and the temperature measurement element 103 are provided as self-heating resistors (self-heating thermistor 120), the configuration may be such that at least the resistor and the elastic body 104 are fixed to the container 9.

Further, the fixture 108 also has a function as a heat insulation material. When the heating member 102, the temperature measurement element 103 are surrounded by the fixture 108, the fixture 108 prevents heat from being released to the outside and reduces the effect from the outside air. Since the fixture 108 has a function as a heat insulation material, variation in sensor measurements can be reduced.

Further, the fixture 108 may be lined with a heat insulation material such as a foam-based heat insulation material which is foam of a synthetic resin such as polystyrene foam, phenolic foam and urethane foam or a fiber-based heat insulation material such as glass wool so that heat generated by the heating member 102 does not escape to the outside. With this configuration, heat from the heating member 102 can be transferred to the container 9 via the thermal conductor 101, which can be uniformly performed in a plurality of sensors 10, thereby reducing variation.

As described above, the parts holding section 109, the terminal 105, the terminal 106 and the elastic body 104 are disposed in the fixture 108, and the guide 107 and the heating member 102 are disposed in the parts holding section 109, and the thermal conductor 101 is disposed in a close contact area between the heating member 102 and the container 9.

When the sensor 10 is not appropriately mounted on the container 9, the guide 107 and the heating member 102 are pressed against the lower part of the parts holding section 109 by the elastic body 104 and are separated from the terminal 105, the terminal 106. Accordingly, the heating member 102 is not energized and is not heated. On the other hand, when the fixture 108 of the sensor 10 is in close contact with the container 9, the thermal conductor 101, the heating member 102, the temperature measurement element 103 and the guide 107 are subject to a repulsive force from the container 9 by a portion which extends beyond the fixture 108 and are lifted from the lower end of the parts holding section 109. As a result, the terminal 105, the terminal 106 come into contact with the guide 107, and accordingly, the heating member 102 generates heat when power is supplied from the feeder line 110, feeder line 111.

With this configuration, variation in measurements can be reduced. Further, when the sensor 10 is not appropriately mounted, the temperature of the heating member 102 does not increase and the safe liquid level detection device 1A can be provided.

Figure 4:
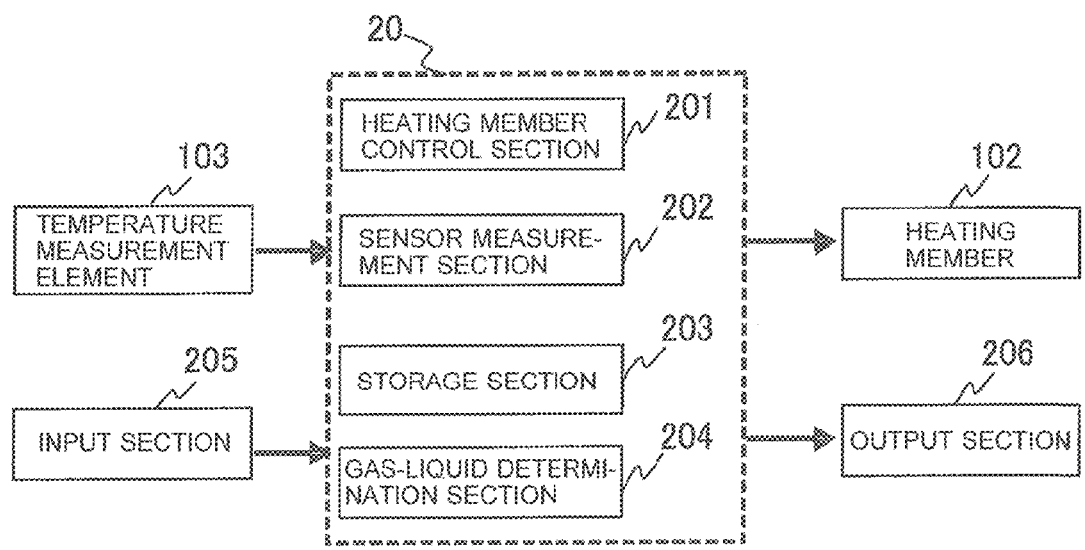
FIG. 4 is a block diagram which schematically shows an electric configuration of a control measurement device which forms the liquid level detection device according to Embodiment 1 of the invention.

FIG. 4 is a block diagram which schematically shows an electric configuration of the control measurement device 20 which forms the liquid level detection device 1A. The control measurement device 20 includes a heating member control section 201, a sensor measurement section 202, a storage section 203 and a gas-liquid determination section 204, and is connected to an input section 205 and an output section 206.

The heating member control section 201 is a section to control simultaneous ON/OFF of a plurality of heating members 102 that constitute a plurality of sensors 10. The sensor measurement section 202 is a section to simultaneously measure a plurality of temperature measurement elements 103 that constitute a plurality of sensors 10. The storage section 203 is a section to store the measurements measured by the sensor measurement section 202. The gas-liquid determination section 204 is a section to analyze the data measured by the sensor measurement section 202 and stored in the storage section 203 to determine the liquid level in the container 9.

The input section 205 is a section to receive information from the outside, and is used, for example, when it receives sensor information of the refrigeration cycle apparatus. The output section 206 is used to output information which is processed in the control measurement device 20 such as information of the liquid level position to the outside. This output section 206 can add a function of remote monitoring for remotely transmitting information.

<Installation Method of Liquid Level Detection Device 1A>

Next, the installation method of the liquid level detection device 1A will be described. The liquid level detection device 1A can be used by mounting a single liquid level detection device 1A on the container 9, identifying the liquid level of the container 9 and outputting the information by the output section 206, or by assembling the liquid level detection device 1A to a device such as the refrigeration cycle apparatus during assembling process, or by connecting and assembling the liquid level detection device 1A to the existing device during maintenance process.

Specifically, the installation method of the liquid level detection device 1A is such that the fixture 108 is mounted on a part of the surface of the container 9 in which there is no irregularity or corrosion by using a force of the fixture 108 coming into close contact with the container 9. When the force of coming into close contact with the container 9 is large, a repulsive force is generated between the fixture 108 and the container 9. Even if the amount of force larger than the amount necessary for close contact is applied, the force is offset by this repulsive force. Accordingly, a uniform force exists between the container 9 and the thermal conductor 101.

The liquid level detection device 1A can be installed by a plurality of methods and examples thereof are shown in FIGS. 5 to 9.

Figure 5:
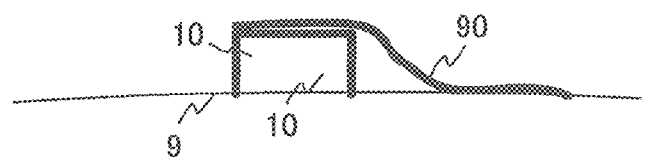
FIG. 5 is a view which shows one example of installation method of the liquid level detection device according to Embodiment 1 of the invention.

FIG. 5 shows a fixation method by using a leaf spring 90 which is disposed on the container 9.

Figure 6:
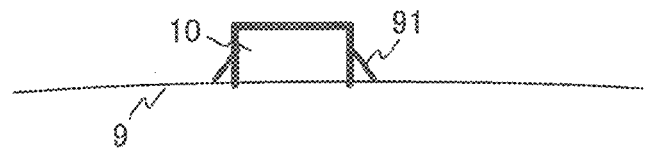
FIG. 6 is a view which shows one example of installation method of the liquid level detection device according to Embodiment 1 of the invention.

FIG. 6 shows a fixation method by using a welding section 91 in which the fixture 108 is directly welded to the container 9.

FIG. 7 shows a fixation method by using a magnet fixation guide 92 and a magnet 93.

FIG. 8 shows a fixation method to the container by using an adhesive 94 such as tape and putty.

FIG. 9 shows a fixation method of the sensor 10 by winding a band 95 around the container 9.

The installation interval of a plurality of sensors 10 is desirably equal interval. When they are disposed with an equal interval, the position of the sensor 10 can be easily associated with the liquid level height. However, when the position of varying liquid level is limited, or when the position of liquid level to be detected is limited, the installation interval of the sensors 10 may not be equal interval, and the interval may be small in an area for high resolution measurement and may be large in an area for low resolution measurement. Accordingly, the number of the sensors 10 may be saved by disposing only the necessary number of sensors 10 at necessary positions.

<Principle of Liquid Level Detection>

Next, a principle of liquid level detection in the liquid level detection device 1A will be described. In the liquid level detection device 1A, the liquid level is detected by using a principle that the temperature in areas on the surface of the container 9 which correspond to portions of the container 9 which contains gas and which contains liquid. The principle will be specifically described.

Comparing the heat transfer coefficient of gas and liquid, the heat transfer coefficient of liquid phase is higher than that of gas phase. Accordingly, when a gas phase and a liquid phase exist in the container 9, and the temperatures are different inside and outside of the container 9, and the temperature outside of the container 9 is higher than the temperature inside of the container 9, the heat transfer coefficient of a portion of the container 9 which contains gas phase is low, and thus the heat flux is small. Further, the heat transfer coefficient of a portion of the container 9 which contains liquid phase is high, and thus the heat flux is large. Therefore, comparing the surface temperatures of a portion of the container 9 which contains gas phase and a portion of the container 9 which contains liquid phase, the surface temperature of a portion of the container 9 which contains gas phase is higher than a portion of the container 9 which contains liquid phase.

Figure 10:
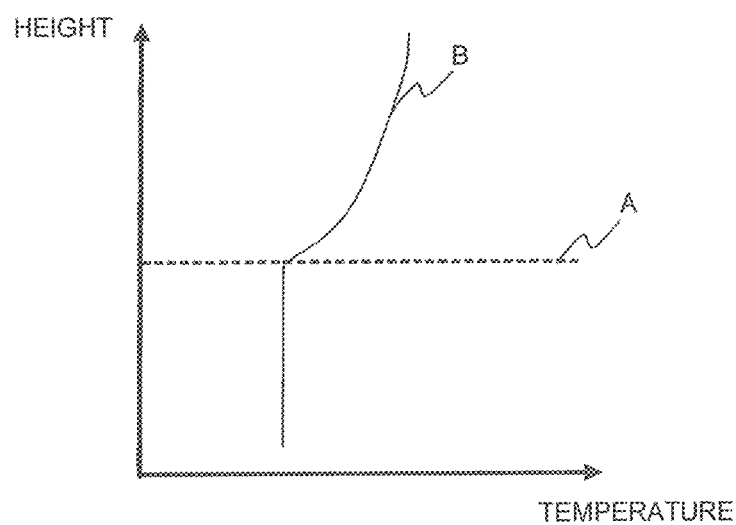
FIG. 10 is a graph which shows results of the measured surface temperature of the container when liquid is stored in the container and the temperature outside of the container is higher than that inside of the container.

FIG. 10 is a graph which shows results of the measured surface temperature of the container 9 when liquid is stored in the container 9 and the temperature outside of the container 9 is higher than that inside of the container 9. In FIG. 10, the horizontal axis represents the temperature and the vertical axis represents the liquid level height. In FIG. 10, A represents the liquid level height and B represents the surface temperature of the container 9 for each height of the container 9. As seen from FIG. 10, the temperature is constant in a lower part of the container 9 in which liquid is stored, while the temperature increases in a gas section which is located above the liquid section and the temperature increases as the distance from the liquid level increases. Accordingly, liquid level detection is performed based on the difference in surface temperature.

Since the sensor 10 heats the heating member 102, the temperature outside of the container 9 becomes higher than that inside of the container 9. As described above, comparing the surface temperatures of a portion of the container 9 which contains gas phase and a portion of the container 9 which contains liquid phase, the surface temperature of a portion of the container 9 which contains gas phase is higher than a portion of the container 9 which contains liquid phase.

<Gas-Liquid Determination Method of Liquid Level Detection Device 1A>

In the liquid level detection device 1A, as described above, the fixture 108 which also serves as a heat insulation material is disposed on the outermost position of the sensor 10 and temperature difference is generated between the inside and outside of the container 9 by the heating member 102. With this configuration, the fixture 108 prevents heat from flowing to and from the outside of the container 9, thereby limiting heat flux to be directed from the heating member 102 to the container 9. Then, heating amount of the heating member 102 and heat resistance between the container 9 and the heating member 102 can be uniform for a plurality of sensors 10. As a result, difference in surface temperature of the container 9 between gas and liquid appears on the side of the heating members 102 opposite to the container 9.

The heater temperatures are different when the inner fluids are different, such as gas phase and liquid phase. The temperatures of the heating members 102 are different for the following reason. In the case where heating amount of the heating members 102 are the same, and when the fluid inside the container 9 is gas phase, heat flux is smaller than liquid phase and heat is not easily transferred to the inside of the container 9. As a result, the heater temperature easily increases. On the other hand, when the fluid inside the container 9 is liquid phase, heat flux is larger than gas phase and heat is easily transferred to the inside of the container 9. As a result, the heater temperature does not easily increase.

Then, a reference sensor is selected from a plurality of sensors 10a to 10c which are disposed on the surface of the container 9, and gas-liquid determination is performed by comparing the measurements of the reference sensor with the measurements of other sensors 10. The sensor 10a which is disposed at the lowermost position on the container 9 as shown in FIG. 1 is selected as a reference sensor for the following three reasons that liquid is stored from a lower part of the container 9, the surface temperature of the container 9 in the liquid section are almost the same, and the surface temperature of the container 9 in the gas section increases as the distance from the liquid level increases.

The measurements of the reference sensor 10a which is selected as a reference sensor are compared with the measurements of the sensor 10b, the sensor 10c, the sensor 10d disposed on the side surface of the container 9. Then, the installation position of the sensor 10 having the same measurements as those of the reference sensor 10a is determined as a liquid section, and the installation position of the sensor 10 having the measurements higher than those of the reference sensor 10a is determined as gas section. In this way, gas-liquid determination, liquid level detection are performed.

Further, the gas-liquid determination method is not limited to the method which uses comparison with the reference sensor measurements, and the following methods are also possible. That is, the temperature inside the container 9 is measured by using the measurements of pressure, temperature sensor when the pressure, temperature sensor are mounted on the devices including the container 9, such as a refrigeration cycle apparatus, or by providing a separate temperature sensor. Then, the surface temperature of the container 9 in the liquid section, gas section in an ideal state is calculated by taking into consideration the heating amount of the heating member 102, the heat resistance of the thermal conductor 101, heating member 102. The states of the sensor installation sections can be determined by comparing the ideal surface temperature of the liquid section, gas section with the measurements of the sensors 10.

<Description of Specific Determination Method>

Figure 11:
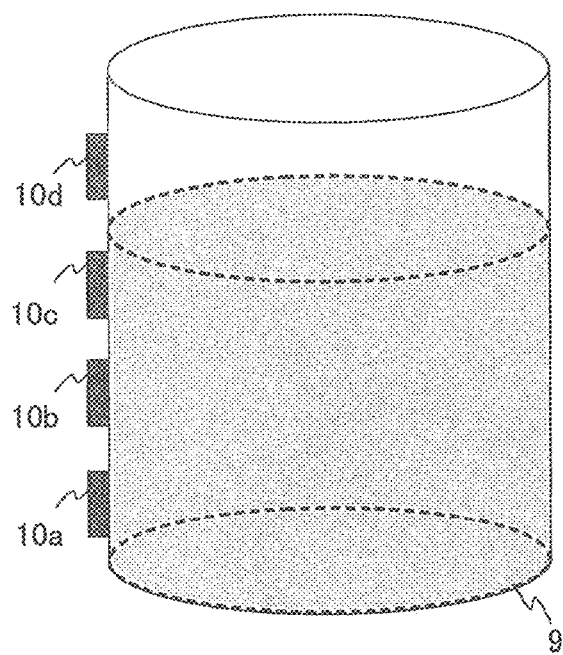
FIG. 11 is a schematic view which schematically shows that liquid is stored in the container.
Figure 12:
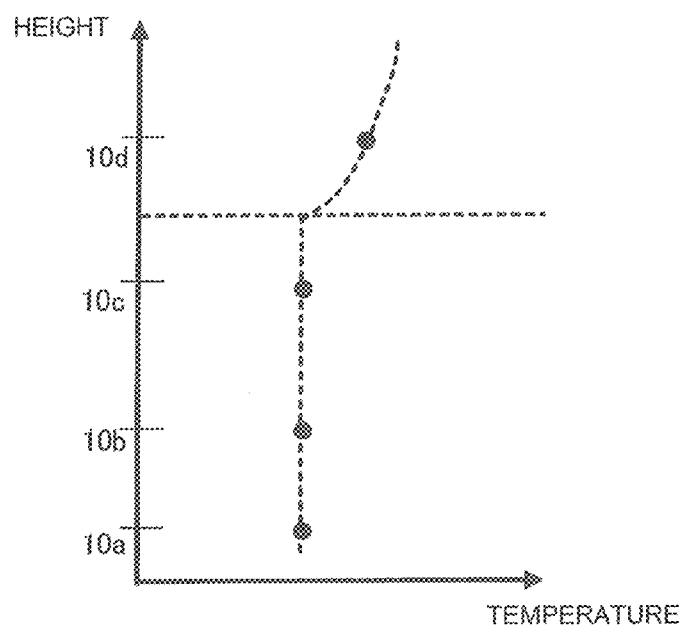
FIG. 12 is a graph which shows measurements of the sensor in a state of FIG. 11.
Figure 13:
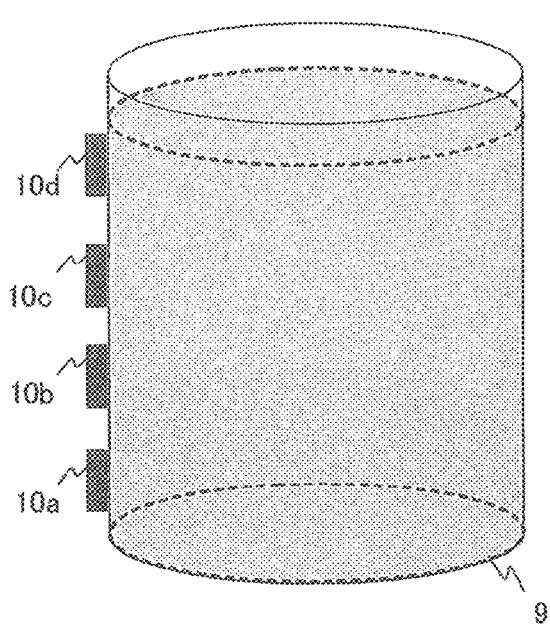
FIG. 13 is a schematic view which schematically shows that liquid is stored in the container.
Figure 14:
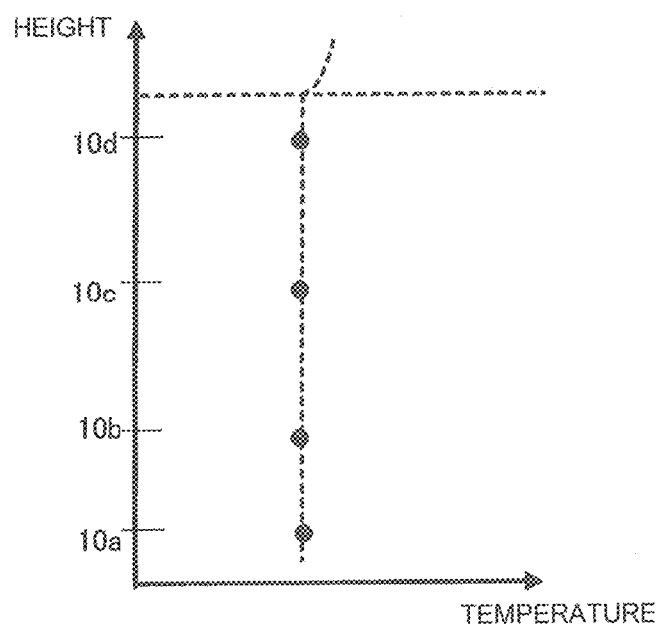
FIG. 14 is a graph which shows measurements of the sensor in a state of FIG. 13.
Figure 15:
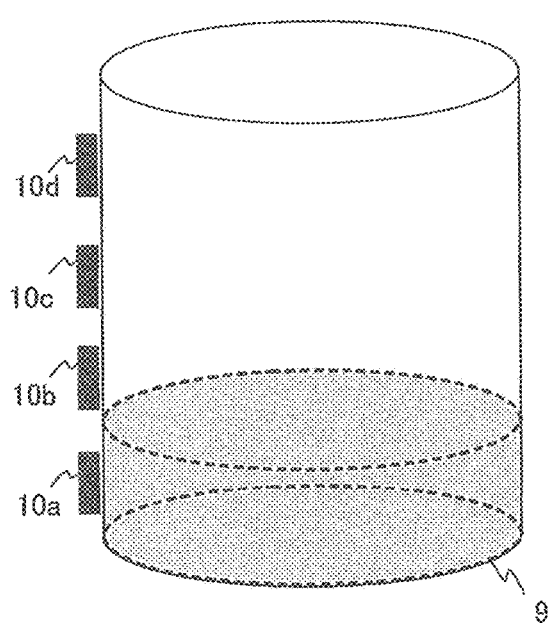
FIG. 15 is a schematic view which schematically shows that liquid is stored in the container.
Figure 16:
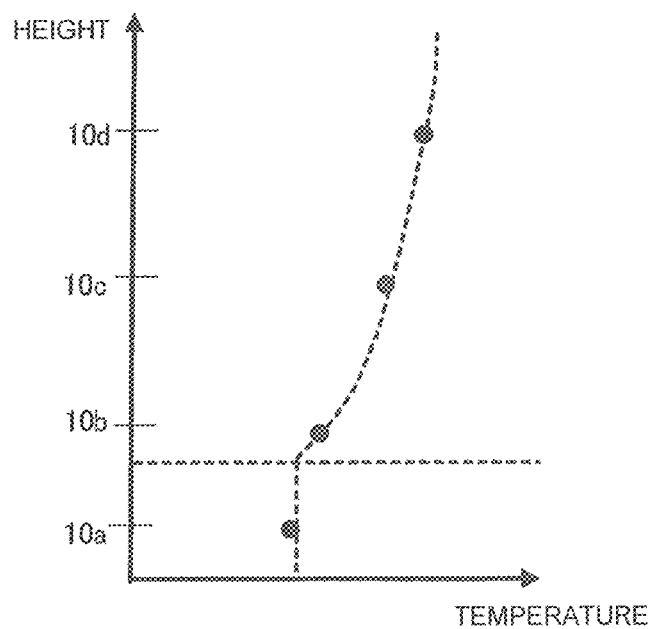
FIG. 16 is a diagram which shows measurements of the sensor in a state of FIG. 15.

Specific determination method of the liquid level detection device 1A will be described with reference to FIGS. 11 to 16. FIGS. 11, 13 and 15 are schematic views which schematically show a state in which liquid is stored in the container 9. FIGS. 12, 14 and 16 are graphs which show the measurements of the sensors 10a to 10d in a state of FIGS. 11, 13 and 15. In FIGS. 11, 13 and 15, an area indicated in gray is the liquid stored in the container 9. Further, in FIGS. 12, 14 and 16, the horizontal axis represents the temperature and the vertical axis represents the liquid level height.

FIG. 11 shows that the liquid level in the container 9 is between the sensor 10c and the sensor 10d, and FIG. 12 shows the measurements of the sensors 10a to 10d in the state of FIG. 11.

In the state of FIG. 11, as shown in FIG. 12, all the measurements of the sensor 10a, the sensor 10b, the sensor 10c are the same, and the measurement of the sensor 10d indicates higher temperature than that of the sensor 10a, the sensor 10b, the sensor 10c. Accordingly, when there is a temperature higher than that of the sensor 10a which is a reference sensor, it is determined that the liquid level is located under the portion of the high temperature. That is, based on the measurements of FIG. 12, the liquid level is detected as being located between the sensor 10c and the sensor 10d of FIG. 11.

FIG. 13 shows that the liquid level in the container 9 is above the sensor 10d, and FIG. 14 shows the measurements of the sensors 10a to 10d in the state of FIG. 13.

In the state of FIG. 13, as shown in FIG. 14, all the measurements are the same. Accordingly, when all the measurements are the same, the liquid level is detected as being located at the top of the sensor, that is, in the upper part of the sensor 10d in FIG. 13.

FIG. 15 shows a state of the liquid in the container 9 when minimum amount of the liquid is stored in the container 9, FIG. 16 shows the measurements of the sensors 10a to 10d in the state of FIG. 15.

Since the oil return hole 9c is located in the container 9 above the bottom part of the container 9 (see FIG. 1), the minimum amount of liquid can be present under the oil return hole 9c. Accordingly, as shown in FIG. 16, the measurement of the sensor 10a indicates lower temperature than that of the sensors 10b to 10d. Accordingly, when only the measurement of the sensor 10a is low as shown in FIG. 16, the liquid level is detected as being located between the sensor 10a and the sensor 10b.

<Inappropriate Installment of Sensor>

The reason that temperature of the heating member 102 does not increase when the sensor is not appropriately installed will be described with reference to FIGS. 17 and 18.

Figure 17:
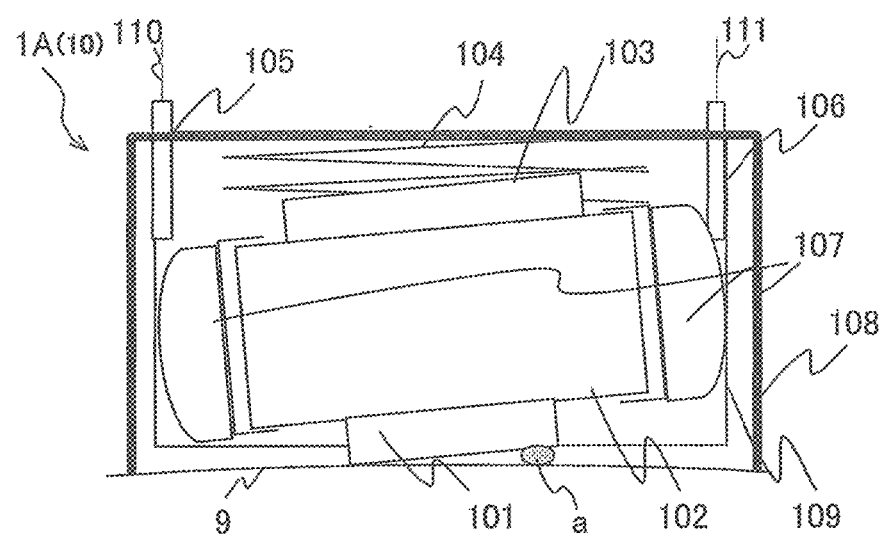
FIG. 17 is a schematic view which shows that a foreign matter is present between a thermal conductor and a container of the liquid level detection device according to Embodiment 1 of the present invention.

FIG. 17 is a schematic view which shows that a foreign matter (foreign matter a) is present between the thermal conductor 101 and the container 9 of the liquid level detection device 1A. When the foreign matter a is interposed between the thermal conductor 101 and the container 9, the heating member 102 is not energized since the terminal 105 is not in close contact with the guide 107 on the side in which the foreign matter a is not present (left-hand side in FIG. 17), and accordingly, the temperature of the heating member 102 does not increase.

FIG. 18 is a schematic view which shows that a foreign matter (foreign matter b) is present between the fixture 108 and the container 9 of the liquid level detection device 1A. When the foreign matter b is interposed between the fixture 108 and the container 9, the heating member 102 is not energized since the terminal 106 is not in close contact with the guide 107 on the side in which the foreign matter b is present (right-hand side in FIG. 18), and accordingly, the temperature of the heating member 102 does not increase.

<Liquid Level Detection Flow>

Figure 19:
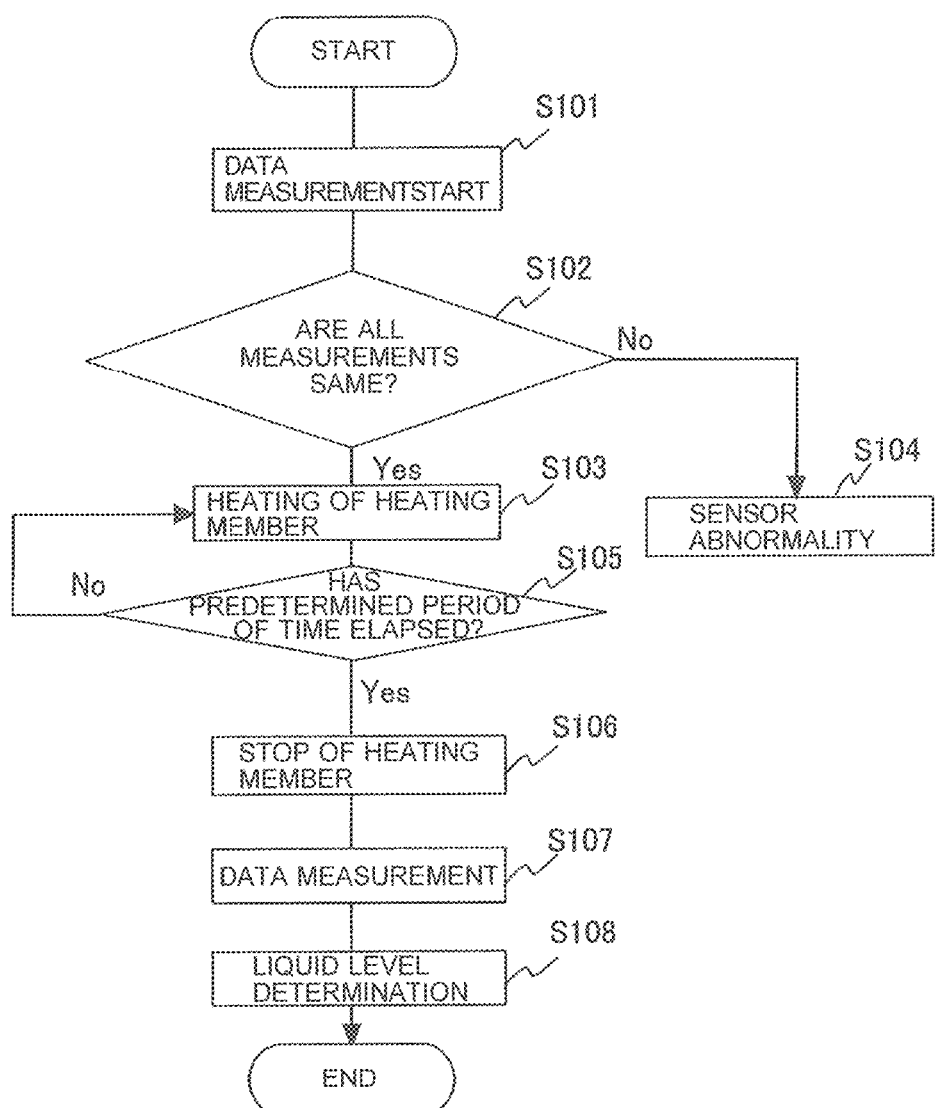
FIG. 19 is a flow chart which shows a processing flow during liquid level detection of the liquid level detection device according to Embodiment 1 of the present invention.

FIG. 19 is a flow chart which shows a processing flow during liquid level detection of the liquid level detection device 1A. Next, with reference to FIG. 19, the liquid level detection flow will be described. The flow will be described by way of example of liquid level detection method when the heating member 102 is turned ON/OFF. The subject of the liquid level detection flow described herein is the control measurement device 20.

First, temperature is measured by all the sensors 10 (S101). The measurements (that is, the measurements before heating of the heating member 102) is used for abnormal detection of the temperature measurement element 103. Next, whether all the measurements measured in S101 are the same or not is checked (S102). When a different measurement is measured (S102; No), it suggests a sensor abnormality such as the sensor 10 coming off or being disconnected and a notice is made (S104).

On the other hand, when all the measurements are the same (S102; Yes), heating of the heating member 102 is performed (S103). Then, whether or not a predetermined period of time (for example, 2 minutes) has elapsed since heating of the heating member 102 has started is determined (S105). When a predetermined period of time has not elapsed, the process goes back to S104. When a predetermined period of time has elapsed, heating of the heating member 102 is stopped (S106). After heating of the heating member 102 is stopped, temperature is again measured by all the sensors 10 (S107). Temperature is measured at this timing, since temperature difference between the inside and outside of the container 9 becomes maximum immediately after heating of the heating member 102 is stopped, and heat flux difference between the gas phase section and the liquid phase section most remarkably appears, that is, change in temperature of the heating member 102 most remarkably appears. Then, liquid level determination is performed in the above described manner by using the measurements measured in S107 (S108), and the liquid level detection is completed.

In the above description, temperature is measured after heating of the heating member 102 is stopped. However, the invention is not limited thereto, and temperature may be measured before heating of the heating member 102 is stopped, since heat flux difference between gas phase and liquid phase most remarkably appears immediately before and after heating of the heater is stopped.

Further, in the above description, liquid level is determined by using temperature difference from the bottom part. However, the invention is not limited thereto, and liquid level may be determined by comparing the duration until the measurement of the temperature measurement element 103 reaches a predetermined temperature (index for the measurement of the temperature measurement element 103). Accordingly, liquid level is determined by using the fact that the measurement of the sensor 10 which corresponds to the gas section tends to increase, while the measurement of the sensor 10 which corresponds to the liquid section does not tend to increase during heating of the heating member 102.

Further, in the above description, all the sensors 10 are mounted on the side surface of the container 9. However, the invention is not limited thereto, and liquid level may be determined by providing the reference sensor 10 in the lower part of the container 9 and comparing with the reference sensor. In this case, the sensor 10 mounted in the lower part may be used as a reference sensor.

Moreover, heating of the heater may be performed on a constant basis, or the heating member 102 may be turned ON/OFF by using the control measurement device 20. In the case where the heating member 102 is turned ON/OFF, unnecessary heating in a period of time in which liquid level detection is not performed can be eliminated.

Embodiment 2

Figure 20:
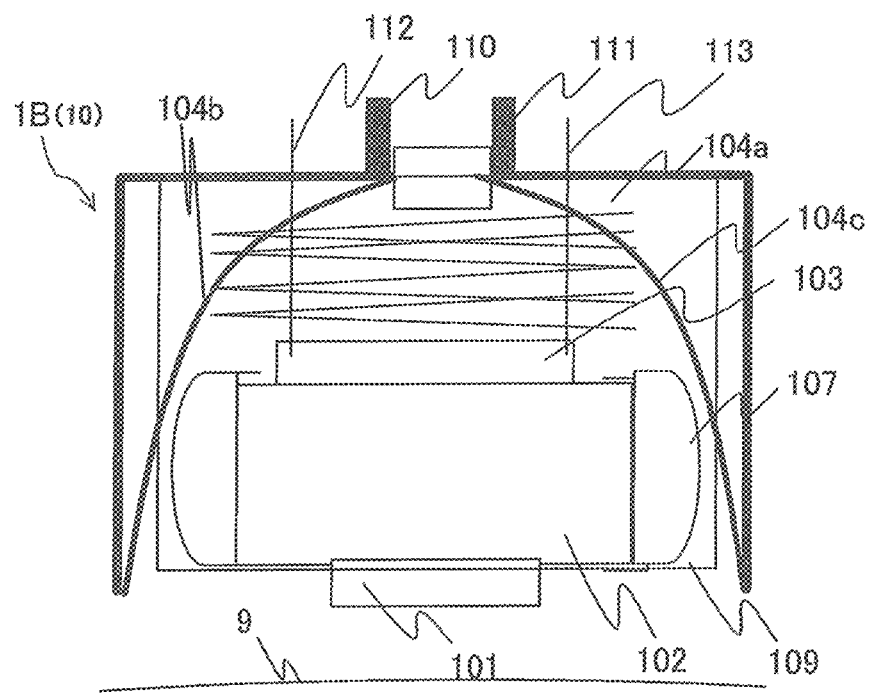
FIG. 20 is a schematic view which shows a schematic configuration of the liquid level detection device according to Embodiment 2 of the present invention.
Figure 21:
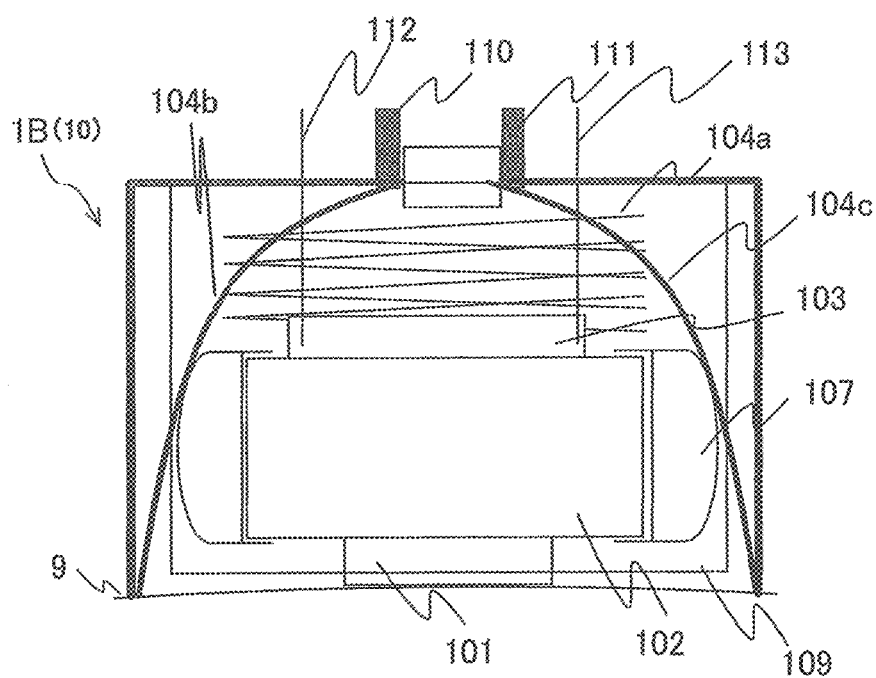
FIG. 21 is a schematic view which shows a schematic configuration of the liquid level detection device according to Embodiment 2 of the present invention.

FIGS. 20 and 21 are schematic views which show a schematic configuration of a liquid level detection device 1B according to Embodiment 2 of the present invention. Based on FIGS. 20 and 21, the liquid level detection device 1B will be described. The basic configuration of the liquid level detection device 1B according to Embodiment 2 is the same as that of the liquid level detection device 1A according to Embodiment 1. In Embodiment 2, the description is provided focusing on the difference from Embodiment 1, and the same elements as those of Embodiment 1 are denoted by the same reference numbers and the description thereof is omitted. Further, modified examples which are applied to components similar to those of Embodiment 1 are also applied to Embodiment 2.

The liquid level detection device 1B has a configuration in which the terminal 105, the terminal 106, which are used to transmit power to the heating member 102 in the liquid level detection device 1A according to Embodiment 1 shown in FIGS. 2 and 3, are not provided and an elastic body 104a serves as an energizing path (transmission line). FIG. 20 shows that the sensor 10 is not in contact with the container 9, and FIG. 21 shows that the sensor 10 is in contact with the container 9.

The liquid level detection device 1B differs from the liquid level detection device 1A in that the liquid level detection device 1A includes the terminal 105, the terminal 106, while the liquid level detection device 1B includes the elastic body 104a instead of the terminals such that the elastic body 104a generates a force pressing the guide 107 toward the container 9 when it comes into close contact with the container 9. The elastic body 104a is made up of an elastic body 104b and an elastic body 104c, each of which is formed of a leaf spring. The elastic body 104b and the elastic body 104c are electric conductors, and the heating member 102 can be energized when the sensor 10 is appropriately mounted on the container 9.

As described above, the elastic body 104a which is an electric conductor can prevent failure in contact between the terminal and the heating member 102 which is point-contact, and allows for good contact.

Embodiment 3

Figure 22:
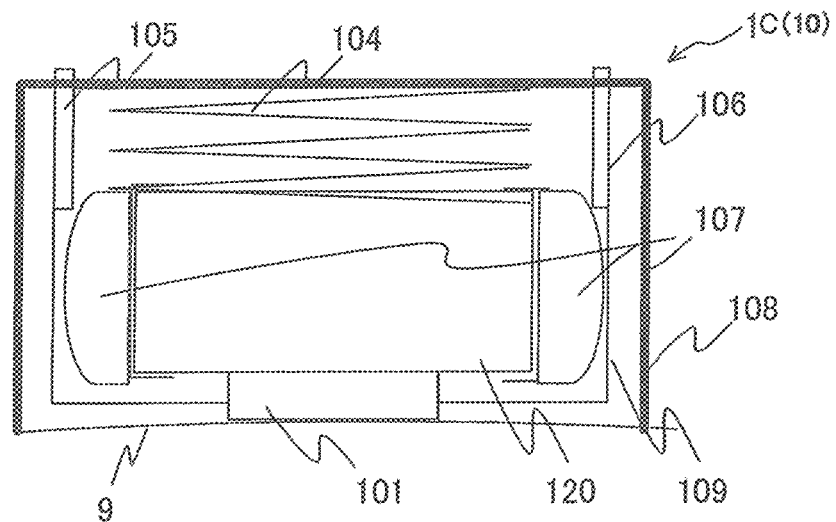
FIG. 22 is a schematic view which shows a schematic configuration of the liquid level detection device according to Embodiment 3 of the present invention.

FIG. 22 is a schematic view which shows a schematic configuration of a liquid level detection device 1C according to Embodiment 3 of the present invention. Based on FIG. 22, the liquid level detection device 1C will be described. The basic configuration of the liquid level detection device 1C according to Embodiment 3 is the same as that of the liquid level detection device 1A according to Embodiment 1. In Embodiment 3, the description is provided focusing on the difference from Embodiment 1 and Embodiment 2, and the same elements as those of Embodiment 1 and Embodiment 2 are denoted by the same reference numbers and the description thereof is omitted. Further, modified examples which are applied to components similar to those of Embodiment 1 are also applied to Embodiment 3.

The liquid level detection device 1C includes a self-heating thermistor 120 which is a self-heating resistor instead of the heating member 102, the temperature measurement element 103 of the liquid level detection device 1A according to Embodiment 1 shown in FIGS. 2 and 3. Providing the self-heating thermistor 120 can eliminate the signal line 112, the signal line 113, and allows for manufacturing of sensors of a smaller size. Further, an installation operation of sensors can be more effectively performed since a smaller number of wirings are provided.

Further, the liquid level detection device 1C may include the elastic body 104a instead of the terminal 105 and the terminal 106 such that the elastic body 104a generates a force pressing the guide 107 toward the container 9 when it comes into close contact with the container 9. That is, the liquid level detection device 1C may be provided with the elastic body 104a of the liquid level detection device 1B while being provided with the self-heating thermistor 120. With this configuration, the liquid level detection device 1C performs the same effect as that of the liquid level detection device 1B.

In Embodiments 1 to 3, the configuration which includes the guide 107 has been described. However, the heating member 102 may also serve as the guide 107, thereby eliminating the guide 107. In the configuration which does not include the guide 107 can reduce the number of components, and thus the liquid level detection device can be simplified. Further, when the guide 107 is included in the configuration, the guide 107 is regarded as being included in the heating member 102.

In Embodiments 1 to 3, the configuration which includes the thermal conductor 101 has been described. However, the thermal conductor 101 may not be necessarily provided. The thermal conductor 101 is included in the configuration taking into consideration the effect of small irregularities having a height of 0.1 to 0.2 mm which are formed on the surface of the container 9 during painting. That is, the irregularities on the surface of the container 9 can be absorbed by providing the thermal conductor 101 having a thickness in the order of 1 mm. Therefore, when small irregularities are not formed on the surface of the container 9, the thermal conductor 101 may not be provided.

In Embodiments 1 to 3, a configuration in which a plurality of sensors 10 are mounted at plurality of positions on the container 9 has been described. However, the liquid level detection device may be provided as a liquid level switch by using only one sensor 10. Specifically, a sensor 1 may be disposed at a predetermined position (for example, upper limit position of the liquid level, lower limit position of the liquid level) so that a signal is generated when the liquid increases to the predetermined position or more, or alternatively, a signal is generated when the liquid decreases to the predetermined position or less. This allows for detection of increase and shortage of liquid in the container 9.

Embodiment 4

Figure 23:
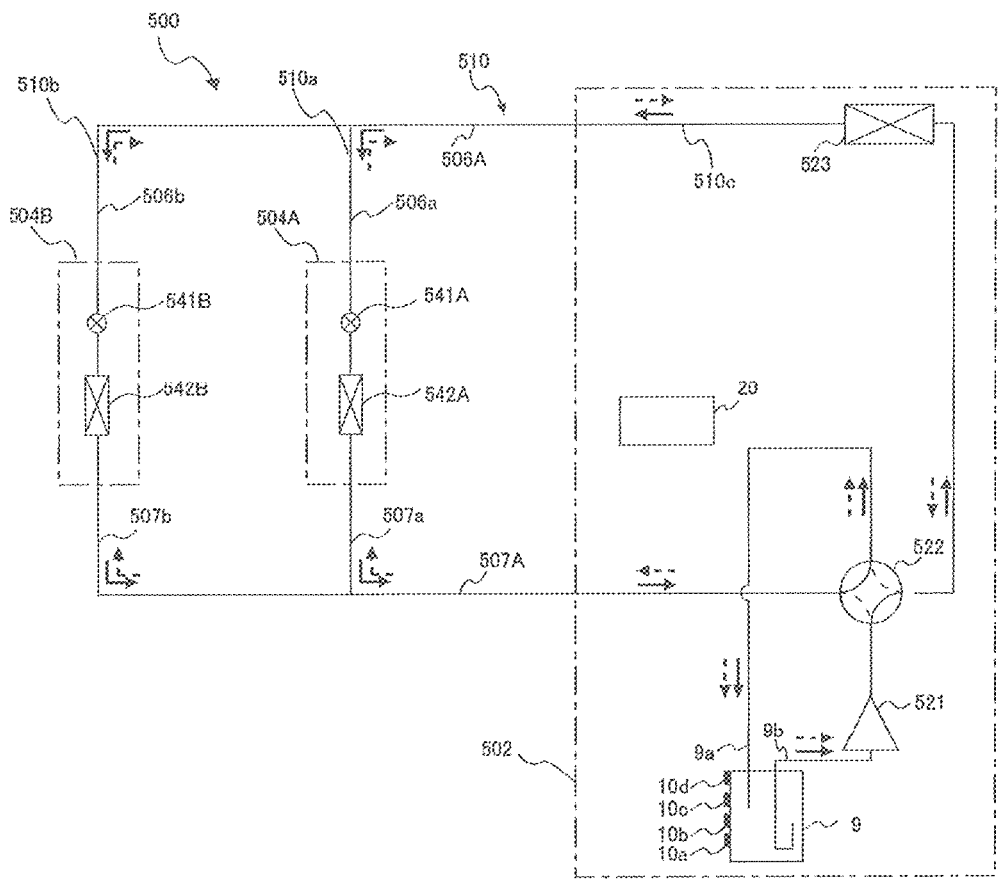
FIG. 23 is a schematic configuration view which shows an example of refrigerant circuit configuration of the refrigeration cycle apparatus according to Embodiment 4 of the present invention.

FIG. 23 is a schematic configuration view which shows an example of refrigerant circuit configuration of a refrigeration cycle apparatus 500 according to Embodiment 4 of the present invention. With reference to FIG. 23, refrigerant circuit configuration and operation of the refrigeration cycle apparatus 500 will be described. The refrigeration cycle apparatus 500 is applied to, for example, air conditioning apparatuses, refrigerators, freezers and hot-water machines. The refrigeration cycle apparatus 500 will be herein described as being applied to an air conditioning apparatus.
<Configuration of Refrigeration Cycle Apparatus 500>

The refrigeration cycle apparatus 500 mainly includes an outdoor unit 502 as a heat source unit, a plurality of (two units are shown in FIG. 23) indoor units 504 (indoor units 504A, 504B) as usage units which are connected in parallel to the outdoor unit 502, and a refrigerant extension pipe (a liquid side extension pipe 506, a gas side extension pipe 507) that connects the outdoor unit 502 to the indoor unit 504. That is, the refrigeration cycle apparatus 500 includes a refrigerant circuit 510 which is formed by connecting the outdoor unit 502 to the indoor unit 504 by using the refrigerant extension pipe.

The liquid side extension pipe 506 is a pipe in which liquid refrigerant flows and connects the outdoor unit 502 to the indoor units 504A, 504B. The liquid side extension pipe 506 is made up of a liquid main pipe 506A, a liquid branch pipe 506a and a liquid branch pipe 506b. Further, the gas side extension pipe 507 is a pipe through which gas refrigerant flows, and connects the outdoor unit 502 to the indoor units 504A, 504B. The gas side extension pipe 507 is made up of a gas main pipe 507A, a gas branch pipe 507a and a gas branch pipe 507b.

[Indoor Unit 504]

The indoor units 504A, 504B receive cooling energy or heating energy from the outdoor unit 502 and supply cooling air or heating air to an air conditioning area. The "A", "B" which follow the indoor unit 504 may be omitted in the following description, which refers to both the indoor units 504A, 504B. Further, components in the "indoor unit 504A" system (including part of circuit) are referred to by adding "A (or a)" to the references, while components in the "indoor unit 504B" system (including part of circuit) are referred to by adding "B (or b)" to the reference numbers. The "A (or a)", "B (or b)" which follow the reference numbers may be omitted, which also refers to components of both the systems.

The indoor unit 504 is embedded in or suspended from the ceiling of rooms, or is hung on the wall of rooms of buildings or the like. The indoor unit 504A is connected to the outdoor unit 502 via the liquid main pipe 506A, the liquid branch pipe 506a, the gas branch pipe 507a and the gas main pipe 507A, and forms part of the refrigerant circuit 510. The indoor unit 504B is connected to the outdoor unit 502 via the liquid main pipe 506A, the liquid branch pipe 506b, the gas branch pipe 507b and the gas main pipe 507A, and forms part of the refrigerant circuit 510.

The indoor unit 504 mainly includes an indoor side refrigerant circuit which forms part of the refrigerant circuit 510 (an indoor side refrigerant circuit 510a in the indoor unit 504A, an indoor side refrigerant circuit 510b in the indoor unit 504B). The indoor side refrigerant circuit is mainly formed of an expansion valve 541 as a throttling device and an indoor heat exchanger 542 as a use side heat exchanger, which are connected in series.

The expansion valve 541 is disposed on the liquid side in the indoor heat exchanger 542 so as to decompress and expand refrigerant in order to adjust the flow rate of the refrigerant which flows in the indoor side refrigerant circuit. The expansion valve 541 may be the one having an opening degree which can be variably controlled, for example, an electronic expansion valve.

The indoor heat exchanger 542 operates as a condenser (radiator) for refrigerant during heating operation so as to heat the indoor air and operates as an evaporator for refrigerant during cooling operation so as to cools the indoor air, exchanges heat between heat medium (such as air and water) and refrigerant, and condenses and liquefies or evaporates and gasifies the refrigerant. The indoor heat exchanger 542 is not limited to a specific type, and may be a fin-and-tube type heat exchanger which is a cross fin type heat exchanger composed of a heat transfer tube and a plurality of fins.

The indoor unit 504 includes an air-sending device (not shown in the figure) that suctions indoor air into the unit, exchanges heat with the refrigerant in the indoor heat exchanger 542, and then supplies a supply air into the room. The air-sending device is a device that can vary the amount of air supplied to the indoor heat exchanger 542 and may be, for example, a centrifugal fan or a multi-blade fan which is driven by a DC fan motor. Further, the indoor heat exchanger 542 may also be a device that exchanges heat between refrigerant and heat medium (such as water and brine) which is not air.

The indoor unit 504 includes an indoor side controller (not shown in the figure) that controls the operation of components of the indoor unit 504. The indoor side control section includes a microcomputer and a memory for controlling the indoor unit 504, and is configured to transmit and receive control signals to and from a remote controller (not shown in the figure) for individually controlling the indoor units 504 or transmit and receive control signals to and from the outdoor unit 502 (specifically, the control measurement device 20) via a transmission line (or wirelessly).

[Outdoor Unit 502]

The outdoor unit 502 has a function of supplying cooling energy or heating energy to the indoor unit 504. The outdoor unit 502 is installed, for example, outside of buildings, and is connected to the indoor unit 504 via the liquid side extension pipe 506, the gas side extension pipe 507, and forms part of the refrigerant circuit 510. That is, the refrigerant which flows out from the outdoor unit 502 and flows through the liquid main pipe 506A is branched into the liquid branch pipe 506a and the liquid branch pipe 506b, and flows into each of the indoor units 504A, 504B. Similarly, the refrigerant which flows out from the outdoor unit 502 and flows through the gas main pipe 507A is branched into the gas branch pipe 507a and the gas branch pipe 507b, and flows into each of the indoor units 504A, 504B.

The outdoor unit 502 mainly includes an outdoor side refrigerant circuit 510c which forms part of the refrigerant circuit 510. The outdoor side refrigerant circuit 510c is mainly formed of a compressor 521, a four-way valve 522 which is a flow path switching unit, an outdoor heat exchanger 523 as a heat source side heat exchanger and the container 9, which are connected in series.

The compressor 521 is configured to suction refrigerant and compress the refrigerant to be high temperature and high pressure. The compressor 521 can vary operating capacity, and may be, for example, a positive-displacement compressor which is driven by a motor in which a frequency F is controlled by an inverter. Although FIG. 23 shows an example in which one compressor 521 is provided, the invention is not limited thereto and two or more compressors 521 may be provided and connected in parallel depending on the number of the indoor units 504.

The four-way valve 522 switches a flow direction of refrigerant during heating operation and a flow direction of heat source side refrigerant during cooling operation. The four-way valve 522 is switched to a position indicated by the solid line during cooling operation so as to connect the exhaust side of the compressor 521 to the gas side of the outdoor heat exchanger 523 and connect the container 9 and the gas main pipe 507A. Accordingly, the outdoor heat exchanger 523 operates as a condenser for the refrigerant compressed by the compressor 521, and the indoor heat exchanger 542 operates as an evaporator. The four-way valve 522 is switched to a position indicated by the dotted line during heating operation so as to connect the exhaust side of the compressor 521 to the gas main pipe 507A and connect the container 9 to the gas side of the outdoor heat exchanger 523. Accordingly, the indoor heat exchanger 542 operates as a condenser for the refrigerant compressed by the compressor 521, and the outdoor heat exchanger 523 operate as an evaporator.

The outdoor heat exchanger 523 operates as an evaporator for refrigerant during heating operation and as a condenser (radiator) for refrigerant during cooling operation, exchanges heat between heat medium (such as air and water) and refrigerant, and evaporates and gasifies or condenses and liquefies the refrigerant. The outdoor heat exchanger 523 is not limited to a specific type, and may be a fin-and-tube type heat exchanger which is a cross fin type heat exchanger composed of a heat transfer tube and a plurality of fins. Further, the gas side of the outdoor heat exchanger 523 is connected to the four-way valve 522 and the liquid side of the outdoor heat exchanger 523 is connected to the liquid main pipe 506A.

The outdoor unit 502 includes an air-sending device (not shown in the figure) that suctions outdoor air into the unit, exchanges heat with the refrigerant in the outdoor heat exchanger 523, and then exhausts the air to the outdoor. The air-sending device is a device that can vary the amount of air supplied to the outdoor heat exchanger 523 and may be, for example, a propeller fan or the like which is driven by a motor such as a DC fan motor. Further, the outdoor heat exchanger 523 may also be a device that exchanges heat between refrigerant and heat medium (such as water and brine) which is not air.

The container 9 is connected to the suction side of the compressor 521 as described in Embodiment 1, and is configured to store excess refrigerant which is generated in the refrigerant circuit 510 depending on variation of the operation load of the outdoor unit 502, the indoor unit 504 or pipes. The container 9 is made of a metal such as carbon steel and should be designed and manufactured as a pressure container having a pressure resistance in compliance with laws and regulations.

In detecting leakage of refrigerant in the refrigerant circuit 510, it is necessary to detect the amount of excess liquid refrigerant stored in the container 9. Accordingly, the container 9 which includes the liquid level detection device described in Embodiments 1 to 3 is provided in the refrigeration cycle apparatus 500.

The outdoor unit 502 includes the control measurement device 20 that controls the operation of components of the outdoor unit 502. The control measurement device 20 includes a microcomputer, a memory for controlling the outdoor unit 502 or an inverter circuit for controlling a motor, and is configured to transmit and receive control signals to and from the indoor side control section of the indoor unit 504 via a transmission line (or wirelessly). That is, the control measurement device 20 cooperates with the indoor side control section to control the operation of the entire refrigeration cycle apparatus 500.

(Extension Pipe)

The extension pipe (the liquid side extension pipe 506, the gas side extension pipe 507) is a pipe necessary for connecting the outdoor unit 502 and the indoor unit 504 and for circulating refrigerant in the refrigerant circuit of the refrigeration cycle apparatus 500.

The extension pipe is made up of the liquid side extension pipe 506 (the liquid main pipe 506A, the liquid branch pipes 506a, 506b), the gas side extension pipe 507 (the gas main pipe 507A, the gas branch pipes 507a, 507b). The extension pipe is a refrigerant pipe which is constructed at the site when the refrigeration cycle apparatus 500 is installed in an installation position such as buildings. The pipe diameter of the extension pipe is determined depending on combination of the outdoor unit 502 and the indoor unit 504.

As described above, the refrigerant circuit 510 is formed by connecting the indoor side refrigerant circuits 510a, 510b, the outdoor side refrigerant circuit 510c and the extension pipe (the liquid side extension pipe 506 and the gas side extension pipe 507). The refrigeration cycle apparatus 500 of Embodiment 4 performs operation by switching a cooling operation and a heating operation using the four-way valve 522 by the indoor side control section and the control measurement device 20, and controls components of the outdoor unit 502 and the indoor units 504A, 504B depending on the operation load of the indoor units 504A, 504B.

Since the container 9 which includes the liquid level detection device described in Embodiments 1 to 3 is provided in the refrigeration cycle apparatus 500, gas-liquid determination can be performed while reducing variation in measurements in a plurality of temperature measurement layers. Accordingly, the refrigeration cycle apparatus 500 can be inexpensive, reduce variation in measurements, achieve easy installation of sensors and detect excess refrigerant in the refrigerant circuit.

REFERENCE SIGNS LIST 1A liquid level detection device 1B liquid level detection device 1C liquid level detection device 9 container 9a inlet pipe 9b outlet pipe 9c oil return hole 9d suction port 10 sensor 10a sensor 10b sensor 10c sensor 10d sensor 20 control measurement device 90 leaf spring 91 welding section 92 magnet fixation guide 93 magnet 94 adhesive 95 band 101 thermal conductor 102 heating member 103 temperature measurement element 104 elastic body 104a elastic body 104b elastic body 104c elastic body 105 terminal 106 terminal 107 guide 108 fixture (mounting tool) 109 parts holding section 110 feeder line 111 feeder line 112 signal line 113 signal line 120 self-heating thermistor 201 heating member control section 202 sensor measurement section 203 storage section 204 gas-liquid determination section 205 input section 206 output section 500 refrigeration cycle apparatus 502 outdoor unit 504 indoor unit 504A indoor unit 504B indoor unit 506 liquid side extension pipe 506A liquid main pipe 506a liquid branch pipe 506b liquid branch pipe 507 gas side extension pipe 507A gas main pipe 507a gas branch pipe 507b gas branch pipe 510 refrigerant circuit 510a indoor side refrigerant circuit 510b indoor side refrigerant circuit 510c outdoor side refrigerant circuit 521 compressor 522 four-way valve 0523 outdoor heat exchanger 541 expansion valve 542 indoor heat exchanger a foreign matter b foreign matter

The invention claimed is:

1. A liquid level detection device that heats a plurality of positions of a container which is a liquid level measurement object and measures temperatures, and detects a liquid level in the container based on the measured temperatures, the liquid level detection device comprising: a heating member that is disposed on a surface of the container, that heats the container, and that includes an outer periphery; a plurality of temperature measurement elements; an elastic body that pushes the heating member toward the container; a guide that is disposed on the outer periphery of the heating member and that moves the heating member in a direction with respect to the container; a terminal that supplies power to the heating member via the guide in response to the terminal contacting the guide; a mounting tool that mounts the heating member, the plurality of temperature measurement elements, the elastic body, the guide, and the terminal on the container; and a controller configured to control the plurality of temperature measurement elements, wherein when the controller determines that all the temperatures measured before heating of the heating member by the plurality of temperature measurement elements are a same, the heating member heats the container during contact of the terminal to the guide depending on a state of the mounting tool being mounted relative to the container, the heating member and the plurality of temperature measurement elements are formed of a self-heating resistor, a thermal conductor disposed between the resistor and the container, the terminal is configured to supply power to the resistor in response to the terminal contacting the resistor via the guide, the mounting tool is configured to cover the resistor, the thermal conductor, the elastic body, the guide and the terminal and mount the resistor, the thermal conductor, the elastic body, the guide and the terminal on the container, and the mounting tool is configured such that the resistor comes or does not come into contact with the terminal via the guide depending on a state of the thermal conductor and the mounting tool being mounted relative to the container, and the container is heated by the heating member when the resistor comes into contact with the elastic body via the guide.

2. The liquid level detection device of claim 1, further comprising: the thermal conductor disposed between the heating member and the container, wherein the mounting tool is configured to cover the heating member, the plurality of temperature measurement elements, the thermal conductor, the elastic body, the guide and the terminal and mount the heating member, the plurality of temperature measurement elements, the thermal conductor, the elastic body, the guide and the terminal on the container, and the mounting tool is configured such that the heating member comes or does not come into contact with the terminal via the guide depending on the state of the thermal conductor and the mounting tool being mounted relative to the container, and the container is heated by the heating member when the heating member comes into contact with the terminal via the guide.

3. The liquid level detection device of claim 2, wherein the terminal and the guide do not come into contact with each other and the heating member is not energized when at least one of the thermal conductor and the mounting tool is not mounted on the container in a predetermined state.

4. The liquid level detection device of claim 2, wherein the heating member does not come into contact with the terminal when a pressing force of the elastic body against the container is smaller than a predetermined amount of force.

5. The liquid level detection device of claim 2, wherein the liquid level detection device is configured to be mounted on the container having a curved outer surface, and the thermal conductor is deformed depending on a curvature of the outer surface of the container.

6. The liquid level detection device of claim 2, wherein the thermal conductor has an outer shape smaller than that of the heating member.

7. The liquid level detection device of claim 1, wherein the terminal and the guide do not come into contact with each other and the resistor is not energized when at least one of the thermal conductor and the mounting tool is not mounted on the container in a predetermined state.

8. The liquid level detection device of claim 1, wherein the resistor does not come into contact with the terminal when a pressing force of the elastic body against the container is smaller than a predetermined amount of force.

9. The liquid level detection device of claim 1, wherein the mounting tool comes into close contact with an outer surface of the container at least at two points on both ends in a horizontal cross sectional view.

10. The liquid level detection device of claim 1, wherein the mounting tool also serves as a heat insulation material.

11. The liquid level detection device of claim 1, wherein the thermal conductor has an outer shape smaller than that of the resistor.

12. A refrigeration cycle apparatus comprising:
a refrigerant circuit formed of a compressor, a condenser, an expansion valve and an evaporator which are connected by a pipe, wherein
the container whose liquid level is detected by the liquid level detection device according to claim 1 is disposed between the evaporator and the compressor so as to be connected to the evaporator and the compressor.

13. The liquid level detection device of claim 1, wherein the guide directs a movement of the heating member towards, or away from, the container as the elastic body pushes the heating member toward the container.

14. The liquid level detection device of claim 1, wherein the guide is electrically conductive.

15. The liquid level detection device of claim 1, further comprising
a second terminal that is configured to supply power to the heating member via the guide in response to the guide contacting the second terminal, wherein
the terminal is a first terminal that is different from the second terminal and that is separated from the second terminal.

16. The liquid level detection device of claim 1, wherein the state of the mounting tool being mounted relative to the container is a predetermined mounting state that mounts the heating member, the plurality of temperature measurement elements, the elastic body, the guide, and the terminal to the container in a predetermined arrangement, and
the terminal is electrically connected to the guide to deliver power to the heating member in the predetermined mounting state of the mounting tool and is electrically disconnected from the guide in a different state of the mounting tool.

17. The liquid level detection device of claim 16, wherein the terminal does not come into contact with the guide in the different state of the mounting tool.

18. The liquid level detection device of claim 1, further comprising
a thermal conductor that is attached to the heating member and that is moved by the guide and the elastic member, wherein
the mounting tool sits flush against the container and the thermal conductor forms to a shape of the container to sit flush against the container in the predetermined mounting state of the mounting tool.

* * * * *